United States Patent
Magnant et al.

(10) Patent No.: US 11,884,597 B2
(45) Date of Patent: Jan. 30, 2024

(54) METHODS FOR JOINING CERAMIC COMPONENTS TO FORM UNITARY CERAMIC COMPONENTS

(71) Applicant: General Electric Company, Schenectady, NY (US)

(72) Inventors: Jerome Geoffrey Magnant, Rexford, NY (US); Jared Hogg Weaver, Clifton Park, NY (US); Daniel Gene Dunn, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/851,751

(22) Filed: Jun. 28, 2022

(65) Prior Publication Data

US 2023/0416163 A1 Dec. 28, 2023

(51) Int. Cl.
*B23K 1/00* (2006.01)
*C04B 37/00* (2006.01)
*B23K 1/19* (2006.01)
*B23K 103/00* (2006.01)

(52) U.S. Cl.
CPC .............. *C04B 37/003* (2013.01); *B23K 1/19* (2013.01); *B23K 2103/52* (2018.08); *C04B 2237/086* (2013.01); *C04B 2237/16* (2013.01); *C04B 2237/60* (2013.01); *C04B 2237/61* (2013.01)

(58) Field of Classification Search
CPC .......... B23K 1/19; B23K 1/20; B23K 1/0008; B23K 2103/52
See application file for complete search history.

(56) References Cited

U.S. PATENT DOCUMENTS

| 3,813,759 | A | | 6/1974 | Heap et al. |
| 4,499,360 | A | | 2/1985 | Rottenbacher |
| 4,526,649 | A | | 7/1985 | Gupta et al. |
| 5,372,298 | A | * | 12/1994 | Glaeser .................. F28F 21/04 228/195 |

(Continued)

FOREIGN PATENT DOCUMENTS

RU 2012467 C1 5/1994

OTHER PUBLICATIONS

Rabin et al., "Joining of SiC and SiC/SiC Composites", Proceedings of the Annual Conference on Fossil Energy Materials, Jan. 1, 1992, pp. 131-142.

*Primary Examiner* — Erin B Saad
(74) *Attorney, Agent, or Firm* — Dority & Manning, P.A.

(57) ABSTRACT

Methods for forming a unitary ceramic component are provided. The method may include: positioning a braze reactant layer in a contact area between a first densified ceramic component and a second densified ceramic component; positioning a pack material around at least a portion of the first densified ceramic component or the second densified ceramic component; positioning at least one infiltrate source in fluid communication with the braze reactant layer; and thereafter, heating the at least one infiltrate source, the pack material, the first densified ceramic component, and the second densified ceramic component to a braze temperature that is at or above a melting point of at least one phase of the infiltrate composition such that at least one phase of infiltrate composition melts and flows into the braze reactant layer and reacts with a ceramic precursor compound therein to form a ceramic material.

20 Claims, 4 Drawing Sheets

(56) References Cited

U.S. PATENT DOCUMENTS

| | | | |
|---|---|---|---|
| 5,447,683 A | | 9/1995 | Montgomery et al. |
| 5,534,091 A | * | 7/1996 | Okuda .................. C04B 37/005 156/89.15 |
| 5,975,407 A | | 11/1999 | Gasse et al. |
| 7,318,547 B2 | | 1/2008 | Gasse |
| 8,678,269 B2 | | 3/2014 | Chaumat et al. |
| 8,789,743 B2 | | 7/2014 | Elliot et al. |
| 9,340,462 B2 | | 5/2016 | Harris et al. |
| 9,573,354 B2 | | 2/2017 | Chamberlain et al. |
| 9,573,852 B2 | | 2/2017 | Revel et al. |
| 9,624,786 B2 | | 4/2017 | Xu et al. |
| 9,776,929 B2 | * | 10/2017 | Chaumat .................. B23K 1/20 |
| 10,947,162 B2 | | 3/2021 | Nelson et al. |
| 11,110,692 B2 | * | 9/2021 | Nelson ...................... C08K 3/34 |
| 2008/0190552 A1 | | 8/2008 | Bouillon et al. |
| 2013/0136878 A1 | * | 5/2013 | Elliot ................ H01L 21/68792 228/119 |
| 2016/0280609 A1 | | 9/2016 | Ritchey |
| 2019/0376389 A1 | | 12/2019 | Roberts et al. |
| 2021/0220935 A1 | | 7/2021 | Nelson et al. |

\* cited by examiner

METHODS FOR JOINING CERAMIC COMPONENTS TO FORM UNITARY CERAMIC COMPONENTS

FIELD

The present subject matter relates generally to ceramic components, along with joining them together.

BACKGROUND

More commonly, ceramic components are being used in various applications, such as gas turbine engines. In particular, ceramic matrix composite (CMC) materials are more frequently being used for various high temperature applications. For example, because CMC materials can withstand relatively extreme temperatures, there is particular interest in replacing components within a combustion gas flow path of a gas turbine engine with components made from CMC materials. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
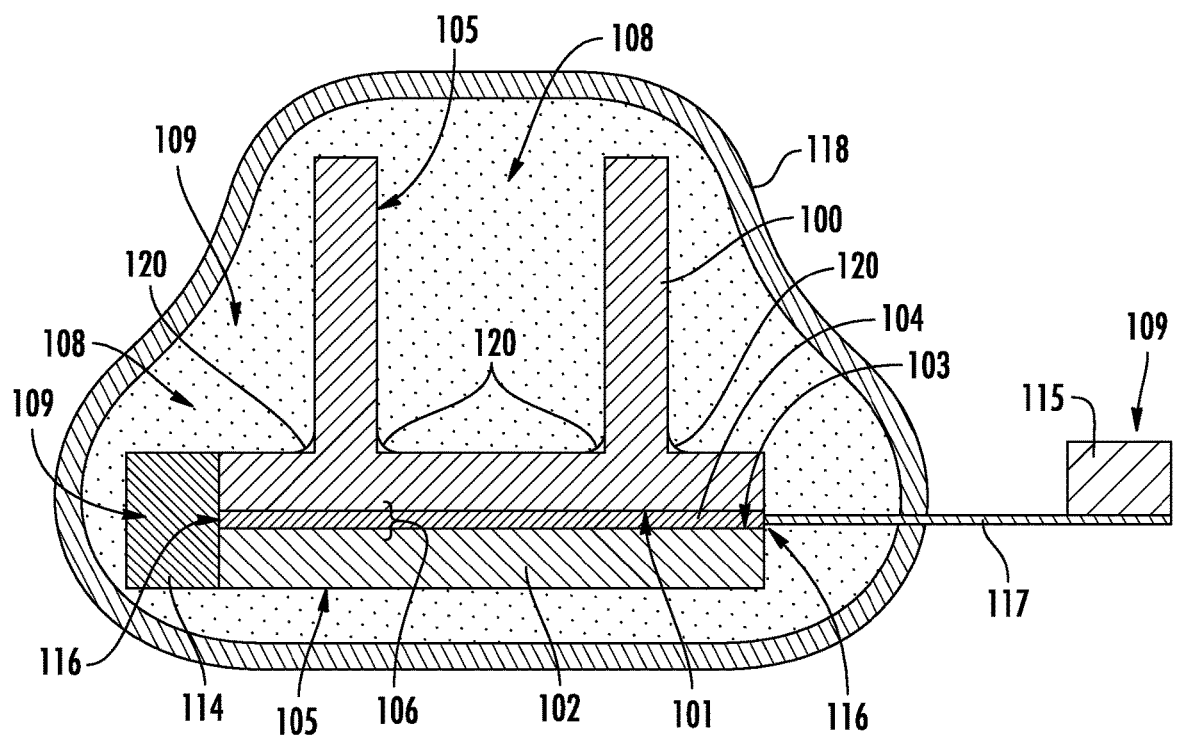
FIG. 1 is a schematic cross-section of exemplary densified ceramic components positioned together for joining with a braze reactant layer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

A "densified ceramic component" is a ceramic having less than 70 vol % porosity. Additionally, the densified ceramic component is in a finished state that will not undergo additional processing steps aimed at improving its mechanical properties. Usually, a densified ceramic component has a mechanical stress above 20 MPa, as measured by a 3 points bending test according to ASTM D790-17.

As used herein, a "melting point" refers to the temperature or range of temperature at which a solid turns to a liquid. If the melting point is a temperature range, then the melting point refers to the lowest temperature within the range at which the solid turns to a liquid.

Large CMC components or parts with complex geometry can be difficult to fabricate in a single piece or at an acceptable yield. As such, improved methods of fabricating CMC components are desired.

The present disclosure is generally directed to methods for forming a unitary ceramic component by joining at least two densified ceramic components together (e.g., a first densified ceramic component to a second densified ceramic component to a third densified ceramic component, etc.). The resulting unitary ceramic component has a unified construction in which the integrated portions are inseparable and bonded to one another to form a continuous component. Thus, such a unitary ceramic component is different from a bonded component comprising separate component pieces that have been joined together but remain distinct with the component pieces being separable (i.e., the pieces may be re-separated). Thus, unitary components may comprise generally substantially continuous pieces of material or may comprise a plurality of portions that are inseparably bonded to one another. In any event, the various portions forming a unitary ceramic component are integrated with one another such that the unitary component is a single piece with inseparable portions. Thus, the resulting unitary ceramic component may be utilized as a single component while being formed in a process that allows more complex shapes to be more easily formed (e.g., without complicated ply layup processes).

Figure 2:
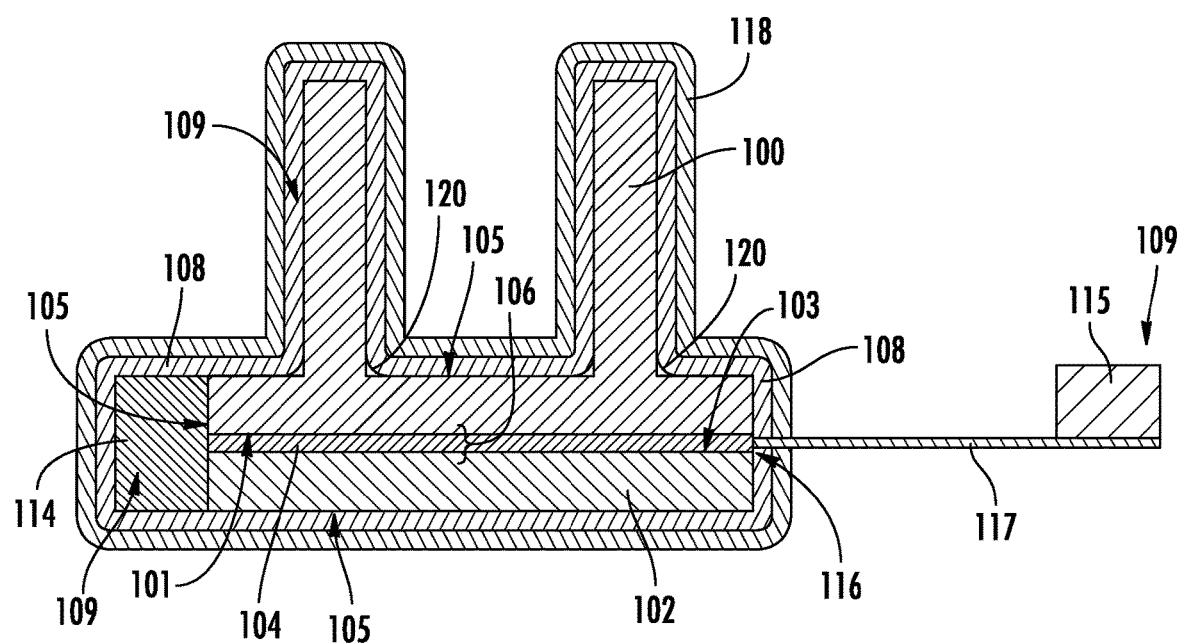
FIG. 2 is a schematic cross-section of other exemplary densified ceramic components positioned together for joining with a braze reactant layer.

Referring to FIGS. 1 and 2, a first densified ceramic component 100 and a second densified ceramic component 102 are generally shown positioned adjacent to each other with a braze reactant layer 104 therebetween. As shown, a first contact surface 101 of the first densified ceramic component is positioned adjacent to a second contact surface 103 of the second densified ceramic component. The first contact surface 101 and the second contact surface 103 form an entire contact area 106 between the first densified ceramic component 100 and the second densified ceramic component

102. Although shown with two densified ceramic components (100, 102), it is understood that any number of densified ceramic components may be utilized, with a braze reactant layer 104 positioned within each contact area 106 therebetween.

In one particular embodiment, the densified ceramic components (100, 102) are ceramic components (e.g., a silicon carbide-based ceramics, such as a reaction bonded silicon carbide ceramics) and/or ceramic matrix components ("CMC") that have already been fully formed via densification via melt infiltration, as discussed below. In one embodiment, at least one of the densified ceramic components (100, 102) contains 1% or more free silicon or free silicon alloy (e.g., 1% by volume to 30% by volume free silicon or free silicon alloy).

In one embodiment, a combination of different types of densified ceramic components (100, 102) can be joined together. For example, the first densified ceramic components (100) may contain free silicon or free silicon alloy (e.g., reaction bonded silicon carbide or ceramic matrix composites fabricated via silicon melt infiltration) and be bonded to the second densified ceramic component (102) that also contains free silicon or free silicon alloy (e.g., reaction bonded silicon carbide or ceramic matrix composites fabricated via silicon melt infiltration). In another embodiment, the first densified ceramic components (100) contains free silicon or free silicon alloy (e.g., reaction bonded silicon carbide or ceramic matrix composites fabricated via silicon melt infiltration) and be bonded to the second densified ceramic component (102) that does not contain any free silicon or free silicon alloy (e.g., CMCs fabricated by chemical vapor infiltration (CVI), by polymer impregnation and pyrolysis (PIP), sintered silicon carbide, hot-pressed silicon carbide, silicon nitride, boron carbide, or combination of methods or materials).

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon, silicon alloys, silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) may also be included within the CMC matrix, along with inorganic fillers (e.g., pyrophyllite, wollastonite, mica, talc, kyanite, and montmorillonite) in the form of matrix fillers.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent thermo-chemical processing, such as melt-infiltration with silicon, to arrive at a densified ceramic component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., blades and vanes), combustors, shrouds and other like components, that would benefit from the lighter-weight and higher temperature capability these materials can offer.

As stated, the braze reactant layer 104 is positioned in a contact area 106 between the first densified ceramic component 100 and the second densified ceramic component 102. For example, the braze reactant layer 104 may be applied to either or both of the first contact surface 101 of the first densified ceramic component 100 and the second contact surface 103 of the second densified ceramic component 102. In one embodiment, the braze reactant layer 104 is positioned between the entire contact area 106 defined between the first densified ceramic component 100 and the second densified ceramic component 102 such that no gap remains therebetween. As such, a ceramic material may be formed within the entire contact area 106, along with metal and/or intermetallic materials. However, this need not be the case depending on the desired final profile or contour.

The braze reactant layer 104 serves as a precursor to a ceramic layer formed during the joining process. In one embodiment, the braze reactant layer 104 may include a ceramic precursor compound, a braze filler, a binder, a filler, a pore forming compound, a shrinkage control agent, and/or a liquid carrier, along with other optional additives.

Generally, the ceramic precursor compound is reactive with an infiltrate composition. For example, the ceramic precursor compound may include a carbon source material, such as carbon or a carbon-forming resin in the form of a slurry, paste, or tape. Such carbon source materials may react with molten silicon or silicon alloy to form silicon carbide. Examples of carbon source material include, but are not limited to, carbon black or organics materials that leads to carbon after a thermal treatment of pyrolysis, preceramic polymers, graphite powder, graphite flakes, chopped carbon fibers, or mixtures thereof. Organic materials that can lead to carbon after a thermal treatment (e.g., a thermal treatment of pyrolysis), may include carbon-forming resins (e.g., include phenolics, furan or furanic compounds, partially-polymerized resins derived therefrom, poly aryl acetylene, petroleum-tar based resins, and coal tar-based resins), and organic material (e.g., wood, leaves, etc.). For example, the microstructure of wood is a type of cellular composite microstructure, and this microstructure can remain after pyrolysis and conversion to silicon carbide through silicon melt infiltration and thus give a joint with an engineered microstructure (cellular composite microstructure) which can be advantageous for mechanical properties. Preceramic polymers may include, but are not limited to, polycarbosilane, polycarbosilazane, polymethylsilane, poly borosilazane, poly methylvinylsilane, poly silaethylene, poly titanocarbosilane, poly hydridosilazane, poly methylsiloxane, poly phenelylsilsesquioxane. The preceramic polymer, after thermal treatment, yields ceramic material that can help to improve the mechanical properties of the joint.

In other embodiments, the ceramic precursor compound may include silicide forming precursors, such as metals including, but not limited to, Mo, W, Ti, Zr, or a mixture thereof.

The braze reactant layer 104 further may, in certain embodiments, include a braze filler. For example, the braze filler may be ceramic or glass particles having a composition substantially the same as the resulting ceramic material, such as particles of non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. The braze filler may be present in the braze reactant layer up to 80 vol. % relative to the carbon source material, such as 0.1% to 80% (e.g., 10-50 vol. %) relative to the carbon source material. For example, a braze reactant layer may contain, after pyrolysis, 63 vol. % carbon and 37 vol. % SiC along with porosity.

When present, a braze filler may be a material wettable by molten silicon or silicon alloy during the densification process. Such a braze filler may include an inorganic filler or mixture of inorganic fillers (e.g., ceramic materials, metallic materials, or a mixture thereof). The braze filler may be in a powder form, though other morphologies are possible. In one embodiment, the braze filler comprises a plurality of particles having a median diameter less than 10 micrometers. In certain embodiments, the median diameter is less than 5 micrometers, and in particular embodiments less than 1 micrometer. A finer particle size allows for higher surface area, better reactivity, and finer interparticle pores, all of which can be desirable in systems in which at least some of the particles are expected to react with the infiltrant during processing. In other embodiments, the inorganic fillers have different sizes (multimodal particle size distribution) and morphology in order to tailor the porosity to minimize the residual infiltrant, such as free silicon or free silicon alloy content, in the joint after the brazing cycle.

In certain embodiments, the braze filler includes an inorganic filler or mixture of inorganic fillers. The inorganic filler(s), when present, may provide the framework into which the infiltrate composition (e.g., liquid metal or metalloid) is introduced during later processing, to supply one or more materials that ultimately participates in a reaction to form the solid composition of the processed material, and/or to add strength to the processed material. Examples of inorganic fillers may include, but are not limited to, ceramic materials and/or metallic materials. Suitable ceramic materials include, but are not limited to, carbides (e.g., silicon carbide, titanium carbide, zirconium carbide, tantalum carbide, molybdenum carbide, chromium carbide, niobium carbide, boron carbide vanadium carbide, or mixtures thereof), borides (e.g., boron carbide, titanium diboride, zirconium diboride, calcium hexaboride, or mixtures thereof), silicides (e.g., $SiB_6$, $TiSi_2$, $MoSi_2$, or mixtures thereof), oxides (e.g., alumina, silica, zirconia, magnesia, aluminate, lanthanum oxide, mullite, zircon, titanium oxide (rutile, anatase), yttria, ytterbium oxide, lutherium oxide, or mixtures thereof), nitrides (e.g., silicon nitride, titanium nitride, aluminum nitride, zirconium nitride, chromium nitride, niobium nitride, vanadium nitride, or mixtures thereof), or mixtures thereof. Suitable metallic materials include, but are not limited to, silicon and its alloys (e.g., Si—B alloys, Si—Ge alloys, Si—Ti alloys, Si—Y alloys, Si—Hf alloys, Si—Cr alloys, Si—Zr alloys, Si—Co alloys, or mixtures thereof), titanium and its alloys, cobalt and its alloys, zirconium and its alloys, vanadium and its alloy, niobium and its alloy, boron and its alloy, or mixtures thereof. In some embodiments, the metallic material may be in the form of particles and may act as a source of infiltrant for the braze reactant layer itself as they will melt at a temperature below or at the brazing temperature, but in some instances this embodiment may be less desirable than embodiments where the braze reactant layer is substantially free from an infiltrant source. Indeed, when the braze reactant layer act as a source of infiltrant, the melting of a component of the braze reactant layer will often induce some shrinkages of the of the braze reactant layer which may be detrimental for a tight tolerance joint assembly, or leads to some porosity in the braze reactant layer, which can be detrimental for mechanical performances and oxidation resistance of the joint.

In one embodiment, the braze reactant layer 104 is generally tacky prior to curing such that the braze reactant layer 104 adheres the first densified ceramic component 100 and the second densified ceramic component 102 prior to heating. This tackiness may be provided, in particular embodiments, by a binder and/or a liquid carrier. For example, the binder may promote the cohesion of the braze reactant layer and help to temporary maintain the densified ceramic components (100, 102) to join together before the brazing cycle. Suitable binders include, but are not limited to, natural gum (e.g., xanthan gum, gum arabic), polysaccharides (e.g., refined starch, dextrine), lignin extracts (e.g., paper waste liquor), refined alginate (e.g., Na, $NH_4$ alginate), cellulose ethers (e.g., methylcellulose, hydroxyethyl cellulose, sodium carboxyemethyl cellulose), epoxies, polymerized alcohols (e.g., polyvinyl alcohol), polymerized butyral (e.g., polyvinyl butyral), acrylic resins (e.g., polymethyl methacrylate), glycols (e.g., polyethylene glycol), waxes (e.g., paraffin, wax emulsion, microcrystalline wax), soluble silicate (e.g., sodium silicate), organic silicates (e.g., ethylsilicate), soluble phosphates (e.g., alkali phosphate), microcrystalline cellulose, clay (e.g., bentonite, kaolin), soluble aluminates (e.g., soluble aluminate), or combinations thereof.

When present, a reactive filler can react during a thermal treatment with the silicon or with gases present in the reaction process, such as gases like (e.g., CO, $CO_2$, SiO, $N_2$, $NH_3$, $H_2$) to form new compounds and/or react with the metal braze itself. Some examples of reactive fillers include but are not limited to: C, Ti, V, Cr, Zr, Nb, Ta, Mo, W, Al, B, Si, $MoSi_2$, $CrSi_2$, $TiSi_2$, or mixtures thereof. During the thermal treatment, the reaction of the reactive fillers leads to a volume expansion, which can be favorable to reduce the porosity present or free silicon or free silicon alloy present in the joint after the brazing cycle. Reducing the porosity in the joint can be beneficial for mechanical properties and reducing the residual infiltrant, such as free silicon or free silicon alloy, in the joint can be beneficial for the thermo-mechanical properties of the joint.

One or more liquid carriers may be used to apply the braze reactant layer 104. The liquid carrier is generally amenable to volatilization during processing, and may be selected such that it partially or fully dissolves one or more organic components of the formulation, such as the binder. In some embodiments, the liquid carrier comprises water or water-based solvents. In some embodiments, the liquid carrier comprises an organic liquid. The liquid carrier may be present in the formulation in a range of 5 wt % to 65 wt % based on the wet weight, but may be varied as desired depending in part on many factors, among them the desired flow properties and shrinkage behavior of the resulting formulation.

In some embodiments, the braze reactant layer further comprises a pore-forming agent disposed in the liquid carrier. Although the process described herein naturally provides a porous structure due to the removal of liquid carrier and to the reduction in mass achieved during pyrolysis, the formation of pores may be desirably augmented through the use of a pore-forming agent. In one embodiment, the pore-forming agent is a solid, soluble in the carrier, with a lower vapor pressure than the carrier to allow the pore-forming agent to remain behind as a residue while the carrier is being volatilized. The pore-forming agent may be removed, such as by burning out during the pyrolysis step, at a higher temperature after removal of the carrier. In some embodiments, the pore-forming agent is an organic material, albeit a lower char-yielding composition than the binder. Examples of materials suitable for use as the pore-forming agent include polyvinyl butyral (PVB) resin, acrylics, acetates, and cellulosics. A concentration for the pore-forming agent is up to 15 weight percent of the braze reactant layer based on the dry weight of the braze reactant layer prior to brazing, and in certain embodiments the pore-forming agent is present in a concentration from 2 wt % to 10 wt % based on the dry weight of the braze reactant layer prior to brazing. A porosity content of the braze reactant layer after pyrolysis in the range 25 vol % to 70 vol % (e.g., 30 vol % to 55 vol %).

In some embodiments, the braze reactant layer further comprises a shrinkage control agent, which provides a measure of rigidity to the formulation as it is processed. In particular, the mass loss associated with volatilizing the liquid carrier and converting the binder to char creates a driving force to shrink the size of the remaining material. Excessive shrinkage can lead to undesirable cracking within the product material. The shrinkage control agent, then, provides mechanical support to mitigate the tendency to shrink. The shrinkage control agent may be in any form suitable to provide the described function; examples include particulates and fibers. The size of the agent is selected such that shrinkage is controlled while maintaining the desired flow properties and such that the shrinkage control agent does not reduce the ability to be densified with the liquid metalloid infiltrant. In one embodiment, a fiber-shaped shrinkage control agent has an aspect ratio in the range from 3 to 30. Aspect ratio in part determines the amount of shrinkage control agent required, the degree of entanglement of the shrinkage control agent with itself, and the propensity for the shrinkage control agent to develop a preferred alignment during application. Median fiber length for fibers making up the shrinkage control agent may be in the range from 75 to 250 µm with median diameter in the range from 5 to 15 µm. Where the shrinkage control agent is in the form of particles, such as ceramic particles, including, for example, silicon carbide particles with a median size of at least 10 µm. Particles may be used at concentrations up to 60 wt % based on the dry weight of the braze reactant layer, while fibers may be used up to 20 wt % of the formulation.

In one embodiment, a shrinkage control agent comprising carbon-containing filamentary material, such as chopped or milled carbon fibers, can be added to the formulation. In one embodiment, milled carbon fibers are used at a concentration in the range from 1 weight percent to 5 weight percent based on the dry weight of the braze reactant layer prior to brazing. Carbon-containing filamentary materials may be largely, though perhaps not entirely, consumed during infiltration with molten silicon as a result of reacting with silicon to form silicon carbide. Any residual amount of carbon remaining is believed to be in sufficiently small amounts to have no effect on the mechanical or thermal stability or oxidation resistance of the product formed after processing. In addition to or instead of carbon, other compatible materials could foreseeably be used as the material for the shrinkage control agent, such as silicon carbide particles or fiber. It is also possible that a polymeric fiber (e.g., a nylon, cellulose, polyethylene, etc.) could be used as the shrinkage control agent, as long as such materials have requisite mechanical and thermo-chemical properties.

Other additives are applied to the braze reactant layer in certain embodiments. For example, where the braze reactant layer is desired to behave as a thick paste or to exhibit flexibility, as in where the braze reactant layer is applied via tape, a plasticizer optionally may be added to the braze reactant layer. Examples of plasticizers include triethylene glycol bis(2-ethylhexanoate) (available commercially, for instance, via Solutia, Inc. under the SOLUSOLV trade name), dibasic esters, glycols, and phthalates. A plasticizer may be used at a concentration up to 15 weight percent based on the dried weight of the braze reactant layer, and in particular embodiments is present in a range from 2 weight percent to 6 weight percent. Moreover, dispersants, typically surfactants chosen for compatibility with the carrier, are used in some embodiments to improve the separation of solids (such as the ceramic filler particles) within the formulation, thereby reducing agglomeration. Examples of dispersants are polyethylenimine, ammonium polymethacrylate, sodium polymethacrylate, and fish oil. Dispersants may be used in the braze reactant layer at concentrations of up to 3 weight percent of dry particles based on the dry weight of the braze reactant layer prior to brazing, and in some embodiments the concentration is in the range from 0.1 weight percent of dry particles to 3 weight percent of dry particles.

In some embodiments, the method includes creating a braze reactant formulation that is applied onto one or both of the contact surfaces (101, 103) of the densified ceramic components (100, 102). Such as braze reactant formulation may be applied on multiple surfaces and/or as multiple layers onto the contact surfaces (101, 103). Although shown as substantially planar contact surfaces (101, 103), the contact surfaces (101, 103) may be non-planar and may define multiple surfaces, such as in a cavity.

Forming the braze reactant formulation may include combining the ceramic precursor compound, the braze filler, the binder, the reactive filler, the pore forming compound, the shrinkage control agent, and/or the liquid carrier, along with other optional additives together and mixing for a period of time to dissolve all of the soluble materials in the carrier, to deagglomerate any agglomerates, and to disperse the filler particles. Mixing here and elsewhere in the process involves using shear force, extensional force, compressive force, ultrasonic energy, electromagnetic energy, thermal energy or combinations comprising at least one of the foregoing forces or forms of energy, and can be conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing types of processing equipment. Mixing involving the aforementioned forces may be conducted in machines such as single or multiple screw extruders, Buss kneader, Henschel, helicones, Ross mixer, Banbury, roll mill, ball mill, a paint shaker, planetary centrifugal mixer, or the like, or combinations comprising at least one of the foregoing machines.

For example, the braze reactant layer 104 may be applied to a thickness sufficient to adhere the first densified ceramic component 100 and the second densified ceramic component 102 for further processing. In particular embodiments, for example, the braze reactant layer 104 may have a thickness of 10 micrometers (μm) to 2 millimeters (mm).

In one embodiment, a pack material 108 may be positioned around at least a portion of the first densified ceramic component 100 and the second densified ceramic component 102. In the embodiments shown in FIGS. 1 and 2, the first densified ceramic component 100 and the second densified ceramic component 102 are completely encased within the pack material 108 such that substantially all of their respective external surfaces 105 contact the pack material 108.

The pack material 108 generally includes materials from the densified ceramic component that have high vapor pressures at the process conditions, such as a silicon-containing material (e.g., silicon, a silicon alloy, or a mixture thereof), that may inhibit the formation of porosity in densified ceramic components (100, 102) during the heat treatment process. That is, the pack material 108 is applied around the first densified ceramic component 100 and the second densified ceramic component 102 to provide a desired environment during infiltration and densification of the braze reactant layer 104.

In one embodiment, the infiltrate composition of the pack material 108 has a composition of a silicon-containing material such that, when heated during the brazing cycle, a locally high vapor pressure of silicon is created at or near the external surfaces 105 of the first densified ceramic component 100 and the second densified ceramic component 102 with a gas that inhibits the loss of silicon (and associated formation of porosity) from the first densified ceramic component 100 or the second densified component 102. For instance, in embodiments in which the densified ceramic components are a melt infiltrated CMC, the silicon-containing material (e.g., Si metal, a silicon alloy, etc.) may form a Si-rich enclosure with a locally high silicon vapor pressure during infiltration and densification. Without being bound by any particular theory, it is believed that the silicon-containing material that is outside of, but in close proximity to the external surfaces 105 discourages silicon volatilization from the surface of the composite material 105 proximal to the pack material 108 which volatilization would lead to capillary action drawing liquid silicon from within the ceramic component to the surface and would cause the formation of porosity within the densified ceramic component. Thus, the pack material 108 facilitates a higher vapor pressure of constituents, such as silicon, to inhibit the formation of porosity in the densified ceramic components 100, 102.

As such, for joining silicon containing ceramics, the pack material 108 generally includes a silicon-containing material (e.g., silicon, a silicon alloy, or a mixture thereof) that may inhibit the formation of porosity in densified ceramic components (100, 102) during the heat treatment process. For example, the silicon-containing material may include, but is not limited to, pure silicon, a silicon alloy (e.g., Si—B alloys, Si—Ge alloys, Si—Ti alloys, Si—Y alloys, Si—Hf alloys, Si—Cr alloys, Si—Zr alloys, Si—Co alloys, or mixtures thereof), a mixture of constituents (e.g., Si and $B_4C$, Si and B, Si and $SiB_6$, Si and $MoSi_2$, Si and $TiSi_2$, Si and Ge, etc), silicon nitride, or mixtures thereof.

The pack material 108 may also include carbon materials (e.g., carbon black powder, graphite powder, graphite flakes, chopped carbon fibers, etc), and/or inorganic particles such as carbides (e.g., silicon carbide, titanium carbide, zirconium carbide, tantalum carbide, molybdenum carbide, chromium carbide, niobium carbide, boron carbide vanadium carbide, etc.), borides (e.g., boron carbide, boron nitride, titanium diboride, zirconium diboride, calcium hexaboride, etc.), silicides (e.g., $SiB_6$, $TiSi_2$, $MoSi_2$, etc.), oxides (e.g., alumina, zirconia, magnesia, aluminate, lanthanum oxide, mullite, zircon, titanium oxide (rutile, anatase), yttria, ytterbium oxide, lutherium oxide, etc.), nitrides (e.g., silicon nitride, titanium nitride, aluminum nitride, zirconium nitride, chromium nitride, niobium nitride, vanadium nitride, etc.), metallic materials (e.g., titanium and its alloys, cobalt and its alloys, zirconium and its alloys, vanadium and its alloy, niobium and its alloy, boron and its alloy, etc.), or mixtures thereof.

The pack material 108 may also include materials such as binders, dispersants, etc. (e.g., as described above). For example, the binder may promote the cohesion of the pack material 108 and help to temporary hold the pack material 108 close to the densified ceramic components (100, 102) during the brazing cycle. Suitable binders include, but are not limited to, natural gum (e.g., xanthan gum, gum arabic), polysaccharides (e.g., refined starch, dextrine), lignin extracts (e.g., paper waste liquor), refined alginate (e.g., Na, $NH_4$ alginate), cellulose ethers (e.g., methylcellulose, hydroxyethyl celllose, sodium carboxyemethyl cellulose), polymerized alcohols (e.g., polyvinyl alcohol), polymerized butyral (e.g., polyvinyl butyral), acrylic resins (e.g., polymethyl methacrylate), glycols (e.g., polyethylene glycol), waxes (e.g., paraffin, wax emulsion, microcrystalline wax), soluble silicate (e.g., sodium silicate), organic silicates (e.g., ethylsilicate), soluble phosphates (e.g., alkali phosphate), microcrystalline cellulose, clay (e.g., bentonite, kaolin), soluble aluminates (e.g., soluble aluminate), or combinations thereof.

The pack material can be applied by techniques like casting, slurry spray, brushing, manual application with a spatula, squeegee, hands application.

At least one infiltrate source 109 is also positioned in fluid communication with the braze reactant layer 104, such that an infiltrate fluid may flow from the at least one infiltrate source 109 directly into the braze reactant layer 104 or indirectly into the braze reactant layer 104 via a wick (e.g., a wick sheet 117 discussed below). The infiltrate source contains a silicon-containing material which may include, but is not limited to, pure silicon, a silicon alloy (e.g., Si—B alloys, Si—Ge alloys, Si—Ti alloys, Si—Y alloys, Si—Hf alloys, Si—Cr alloys, Si—Zr alloys, Si—Co alloys, or mixtures thereof), a mixture of constituents (e.g., Si and $B_4C$, Si and B, Si and $SiB_6$, Si and $MoSi_2$, Si and $TiSi_2$, Si and Ge, etc), silicon nitride, or mixtures thereof.

In some embodiments, the infiltrate source will react with some constituents of the braze reactant layer to form a new compound that will enhance the properties of the joint. For example, the infiltrate source can contain a silicon alloy that will react with carbon from the braze reactant layer to form silicon carbide. Silicon carbide can be favorable for the thermomechanical properties of the joint as it is a material with good thermomechanical properties.

Generally, the at least one infiltrate source 109 includes an infiltrate composition (e.g., silicon) that may react with the carbon source material of the braze reactant layer 104 to form a ceramic material (e.g., a silicon carbide material). In certain embodiments, multiple infiltrate sources 109 may be positioned in fluid communication with the braze reactant layer 104. Each of the at least one infiltrate source 109 may have a composition that is independent from the other infiltrate sources 109, which allows for tailoring and/or increased control of the localized infiltrate composition within the braze reactant layer 104.

Figure 3:
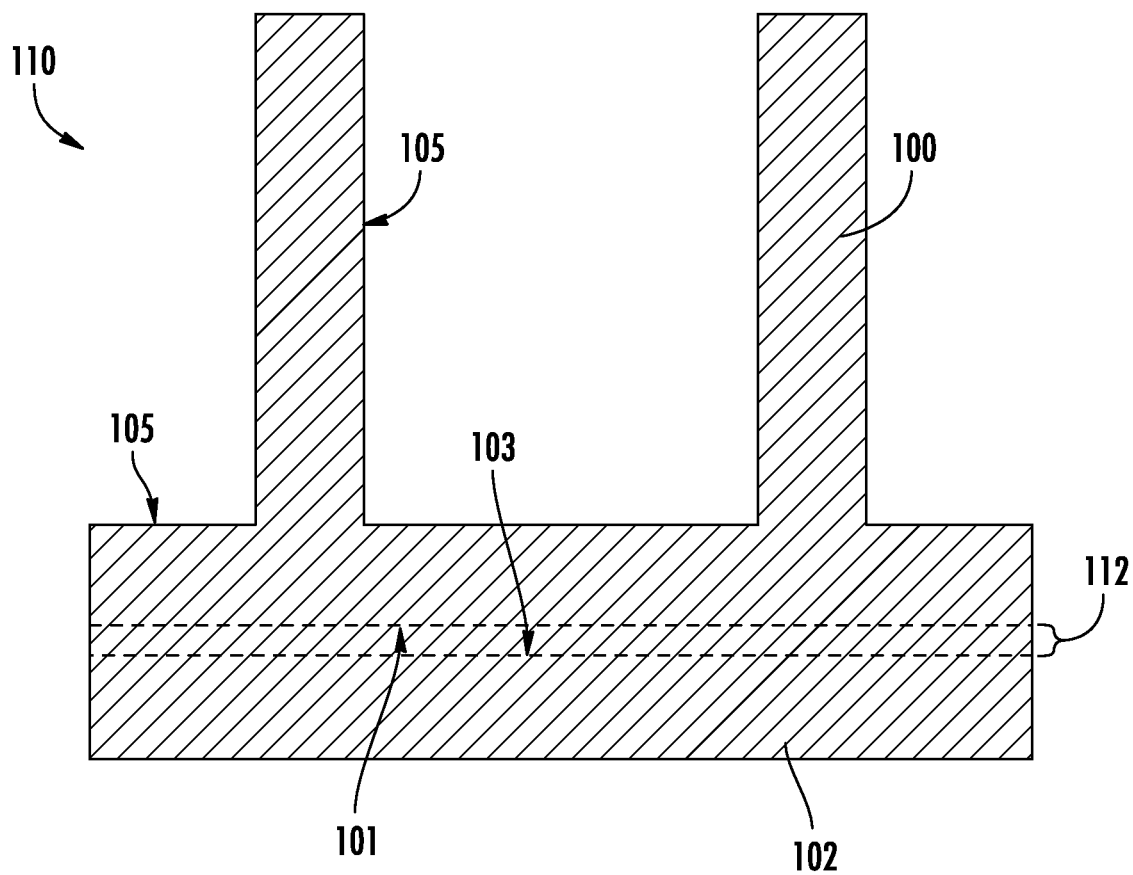
FIG. 3 is a schematic cross-section of a unitary ceramic component, such as formed from either of FIG. 1 or 2.

In one embodiment, the pack material 108 may also serve as the at least one infiltrate source 109 and/or include the at least one infiltrate source 109 such that the infiltrate fluid may flow from the pack material 108 into the braze reactant layer 104 to react with the carbon source material therein to form a ceramic material within the contact area 106. In one embodiment, the at least one infiltrate source 109 includes a silicon-containing material (e.g., silicon, a silicon alloy, or a mixture thereof) that melts at or below the treatment temperature such that Si liquid flows into the braze reactant layer 104 and reacts with C from the carbon source material to form SiC as the ceramic material. Referring to FIG. 3, a unitary ceramic component 110 is shown with a densified ceramic material 112 effectively integrating the first densified ceramic component 100 and the second densified ceramic component 102. As used herein, the terms "integral" or "integrated" or "unitary" describe a monolithic structure formed of a continuous material or group of materials with no seams, connections joints, or the like.

Referring to FIGS. 1 and 2, the pack material 108 may, in certain embodiments, have a pack composition that is different than the infiltrate composition. Consequently, the melting temperature of the pack material 108 may have a melting temperature that is different than the at least one infiltrate source 109 used to densify the first densified ceramic component 100 and the second densified component 102. For example, a SiB alloy (e.g., a SiB eutectic alloy) can be the infiltrant material used to densify the first densified ceramic component 100 and the second densified component 102 and the at least one infiltrate source 109 within the pack material 108 may be silicon metal with a higher melting point than the SiB alloy.

The pack material 108 may also include a parting agent in addition to the silicon-containing material, such as boron nitride (BN). When present, the parting agent may help break apart the resulting pack after heat treatment to unpack the densified unitary ceramic component 110 (FIG. 3).

As desired, the pack material 108 may also contain other materials, such as a binder, a curing agent, a solvent, or mixtures thereof. For instance, a binder or curing agent may be added to the pack material 108 to promote its cohesion and help to temporary maintain the components in position before and during the heat treatment cycle. The quantity of any liquid (e.g., water, aqueous liquids, or organic liquids such as isopropyl alcohol) may be controlled within the pack material 108 to obtain a desired consistency compatible with the application process.

FIG. 1 shows the pack material 108 being in the form of a powder-containing material (e.g., a powder, a paste, etc.) surrounding the external surfaces 105 of the first densified ceramic component 100 and the second densified ceramic component 102. In an alternative embodiment, such as shown in FIG. 2, the pack material 108 may be a coating applied on external surfaces 105 of the first densified ceramic component 100 and the second densified ceramic component 102. Conventional methods known to those skilled in the art may be used to apply or deposit a coating of the pack material 108. Such conventional methods may generally include, but should not be limited to, plasma spraying; high velocity plasma spraying; low pressure plasma spraying; solution plasma spraying; suspension plasma spraying; high velocity oxygen flame (HVOF); electron beam physical vapor deposition (EBPVD); sol-gel; sputtering; slurry processes such as dipping, spraying, rolling, plastering, painting, and applying a putty-like paste; and combinations of these methods. In an exemplary embodiment, pack material 108 may be deposited by a slurry process, e.g., dipping, spraying, rolling, or painting. In another exemplary embodiment, to help control the amount and thickness of pack material 108 deposited, the pack material 108 can be deposited as a shear thinning paste using vibratory molds or tooling. In both embodiments of FIGS. 1 and 2, the pack material 108 is positioned adjacent to the external surfaces 105 and may be removed after processing of the unitary ceramic component 110 of FIG. 3.

Whether or not the at least one infiltrate source 109 is present within the pack material 108, the at least one infiltrate source 109 may also include a braze fillet 114 that is optionally positioned adjacent to at least one external edge 116 of the braze reactant layer 104 between the first densified ceramic component 100 and the second densified ceramic component 102 as shown in FIGS. 1 and 2. In one particular embodiment, the braze fillet 114 includes an infiltrate composition, such as an infiltrate composition having substantially the same composition of the infiltrate composition of the pack material 108 (when present). In another embodiment, the braze fillet 114 includes an infiltrate composition that is different than the infiltrate composition of the pack material 108. Generally, the braze fillet 114 may be positioned to along the at least one external edge 116 of the braze reactant layer 104. Such a local braze fillet 114 may act as a source of infiltrate composition to react with the braze reactant layer 114 and form the joint. Thus, the local braze fillet 114 may ensure sufficient reaction with the braze reactant layer 104 to form the resulting densified ceramic material 112 along the at least one external edge 116.

In particular embodiments, the braze fillet 114 comprises silicon, a silicon alloy, or a mixture thereof. For example, the braze fillet 114 may include 80% by weight or more of silicon and/or a silicon alloy (e.g., 80% by weight to 100% by weight). In one particular embodiment, a boron-containing component may be included within the braze fillet 114, such as boron, boron carbide, and/or boron silicide. For example, the braze fillet may include 2% by weight to 20% by weight of boron carbide (e.g., $B_4C$) and 80% by weight to 98% by weight of silicon. In another embodiment the braze fillet comprises a silicon-boron pre-melted alloy. For example, the braze fillet 114 may be formed from a mix of silicon powder and boron carbide powder. Thus, the braze fillet 114 encourage silicon infiltration of the braze reactant layer 104. As such, the Si reacts with C from the carbon source material to form SiC as the densified ceramic material 112 (FIG. 3), as discussed above.

Referring to FIGS. 1 and 2 and whether or not the at least one infiltrate source 109 is included in the pack material 108 or if the braze fillet 114 is present, the at least one infiltrate source 109 may also include a puck 115 that may be optionally positioned in fluid communication with the braze reactant layer 104 via a wick sheet or strand 117 (e.g., carbon strand). The puck 115 may include a silicon-containing material (e.g., silicon metal, a silicon alloy, etc.) that melts at or below the braze temperature. In addition to the silicon-containing material, the puck 115 may also include other components (e.g., a boron-containing material). The wick sheet 117 transports the melted puck material (e.g., silicon) to the braze reactant layer 104 between the first densified ceramic component and the second densified ceramic component. As shown, the puck 115 may be positioned outside of the pack material 108 in particular embodiments. Generally, the wick sheet 117 is positioned adjacent to each of the puck 115 and the braze reactant layer 104 so as to carry melted infiltrate composition from the puck 115 to the braze reactant layer through the wick sheet 117. The wick sheet 117 may be a fibrous carbon-sheet, such as a nonwoven web, woven web, a felt, a carbon strand, or a carbon strand.

The pack material 108, the first densified ceramic component 100, and the second densified ceramic component 102 may optionally be wrapped with a carbon sheet 118 prior to heating to the braze temperature. For example, the carbon sheet 118 may be a woven sheet, a non-woven sheet, a felt sheet, or a film of carbon-containing material. In one embodiment, the carbon sheet 118 may be a carbon felt, which may be impregnated with a boron-containing material (e.g., boron carbide, boron nitride, etc.). When present, the carbon sheet 118 may help to ensure that the pack material 108 does not fall off and remains around the braze fillet 114 (when present), the first densified ceramic component 100, and the second densified ceramic component 102. During heating, the infiltrate composition may react with the carbon sheet 118 to form a ceramic material within the carbon sheet 118, which is then be removed from around the first densified ceramic component 100 and the second densified ceramic component 102 and the pack material 108 from external surfaces 105 of the unitary ceramic component 110 (FIG. 3).

Optionally, a mask 120 may be applied to a portion of the external surface 105 of the first densified ceramic component 100 and/or the second densified ceramic component 102 to limit bonding of the pack material 108. More particularly, the mask 120 helps impede or prevent the pack material 108 during brazing from attaching to the areas of the external surfaces 105 that are sensitive to buildup of constituents of the pack material 108, such as silicon. For example, the areas of the external surfaces 105 may be one or more machined features (e.g., cooling holes, attachment or mounting holes, slots, and/or sealing surfaces), features having critical dimensions (e.g., machined features having small tolerances), or areas where it would be difficult to remove buildup of unwanted material (e.g., unwanted or accumulated silicon or the like). In this way, the mask 120 may be considered an outer surface pre-treatment. It will be appreciated that the mask 120 is selectively applied over the external surfaces 105, and one or more portions of the external surface 105 may remain uncoated or untreated with the mask 120. In some embodiments, the mask 120 is not required or may be omitted, and therefore, no mask 120 is applied to the external surface 105 prior to applying the pack material 108. In exemplary embodiments, the mask 120 is a non-organic parting agent capable of withstanding a temperature of at least 1000° C., e.g., a temperature within a range of 1000° C. to about 1600° C., such as boron nitride (BN) or a similar parting agent that limits the bonding of the pack material 108. In one embodiment, the mask may be a non-silicon wetting compound that is applied on the surface of the ceramic component to mask from silicon. An example of a non-wetting ceramic component is boron nitride. Boron nitride can be applied in the form of a ceramic suspension on the surface of the ceramic component as a mask.

The pack material 108, the first densified ceramic component 100, and the second densified ceramic component 102 are then heated to a braze temperature that is at or above the melting point of at least one component of the at least one infiltrate source 109. Thus, that component of the at least one infiltrate source 109 forms a liquid to infiltrate the braze reactant layer 104 and react with the carbon source material to form, as shown in FIG. 3, the densified ceramic material 112 joining the first densified ceramic component 100 and the second densified ceramic component 102 into the unitary ceramic component 110.

In one embodiment, ceramic material of the unitary ceramic component 110 includes a densified ceramic material 112 along the entire contact area 106 between the densified ceramic components 100, 102 (e.g., along the first contact surface 101 of the first densified ceramic component 100 and the second contact surface 103 of the second densified ceramic component 102). For example, the densified ceramic material 112 may have substantially the same composition as the ceramic material of the densified ceramic components 100, 102 such that the resulting unitary ceramic component 110 includes a unitary ceramic material therein.

After heating and subsequent cooling, the pack material 108 (along with the optional carbon sheet 118, and the optional mask 120) are removed from the external surfaces 105 to reveal the resulting unitary ceramic component 110 (FIG. 3).

The unitary ceramic component 110 is particularly suitable for use as a component found in high temperature environments, such as those present in gas turbine engines, for example, combustor components, turbine blades, shrouds, nozzles, heat shields, and vanes. In particular, the unitary ceramic component 110 may be a component positioned within a hot gas flow path of the gas turbine. The term "gas turbine engine" refers to an engine having a turbomachine as all or a portion of its power source. The term "turbomachine" or "turbomachinery" refers to a machine including one or more compressors, a heat generating section (e.g., a combustion section), and one or more turbines that together generate a torque output. Example gas turbine engines include turbofan engines, turboprop engines, turbojet engines, turboshaft engines, etc., as well as hybrid-electric versions of one or more of these engines.

Figure 4:
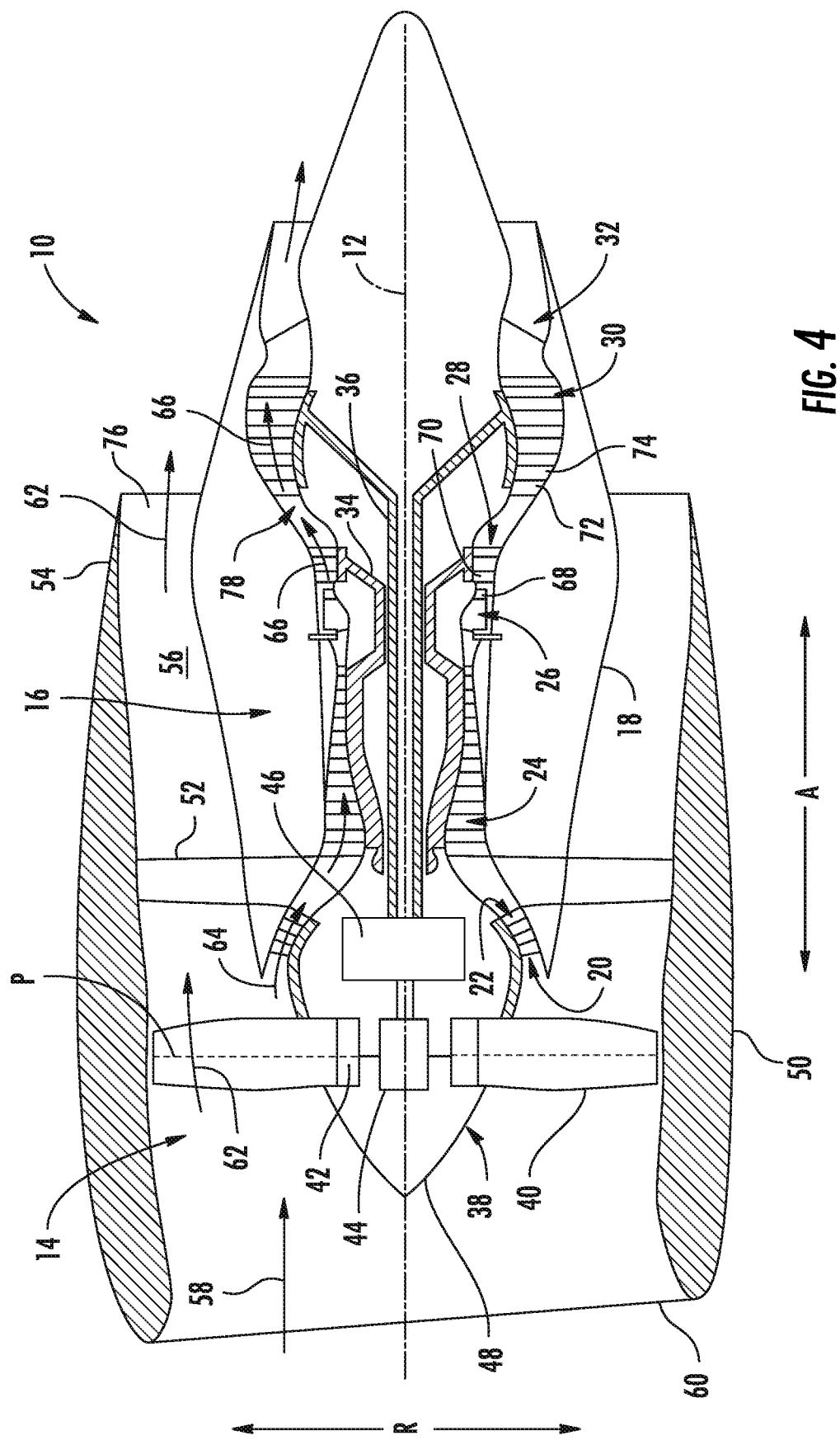
FIG. 4 is a schematic cross-sectional view of an exemplary gas turbine engine according to various embodiments of the present subject matter.

FIG. 4 is a schematic cross-sectional view of a gas turbine engine in accordance with an exemplary embodiment of the present disclosure. More particularly, for the embodiment of FIG. 4, the gas turbine engine is a high-bypass turbofan jet engine 10, referred to herein as "turbofan engine 10." As shown in FIG. 4, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units. It is also applicable to other high temperature applications.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) spool or shaft 34 drivingly connects the HP turbine 28 to the HP compressor 24. A low pressure (LP) spool or shaft 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 4, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air as indicated by arrows 62 is directed or routed into the bypass airflow passage 56 and a second portion of the air as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP spool or shaft 34, thus causing the HP spool or shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP spool or shaft 36, thus causing the LP spool or shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 5:
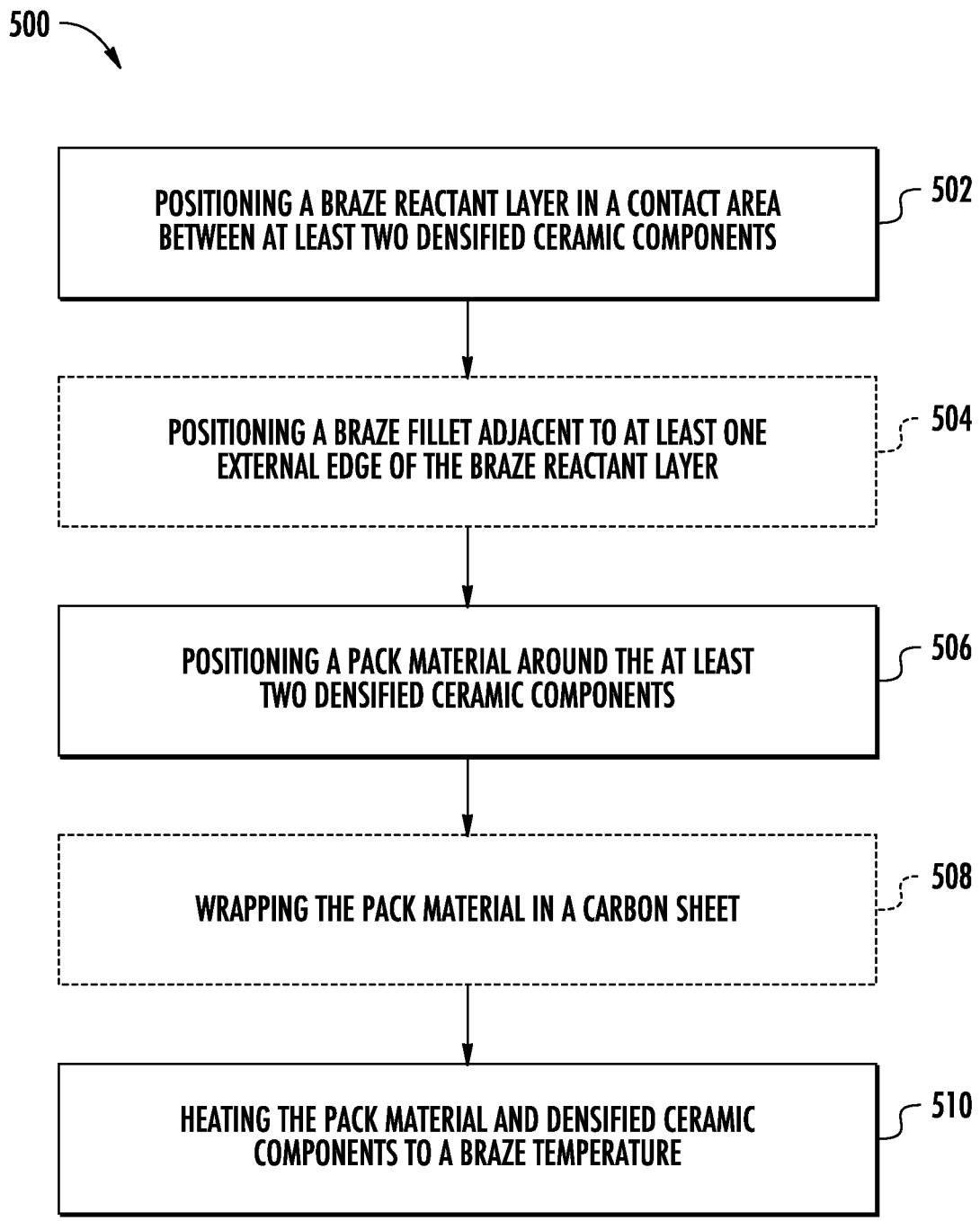
FIG. 5 is a flow chart diagram of an exemplary method of joining densified ceramic components together to form a unitary ceramic component, such as shown in FIG. 3.

Methods are also generally provided for joining a first densified ceramic component to a second densified ceramic component to form a unitary ceramic component, as described above. For example, FIG. 5 shows a diagram of an exemplary method 500 for joining two (or more) densified ceramic components together. At 502, a braze reactant layer is positioned in a contact area between at least two densified ceramic components (e.g., the first densified ceramic component 100 and the second densified ceramic component 102 described above with respect to FIGS. 1 and 2). Optionally, at 504, a braze fillet is positioned adjacent to at least one external edge of the braze reactant layer, as described above. At 506, a pack material is positioned around the at least two densified ceramic components. Optionally, at 508, the pack material may be wrapped in a carbon sheet. At 510, the pack material and densified ceramic components are heated to a braze temperature, which is generally above the melting point of the infiltrate composition as described above. Thus, the infiltrate composition (e.g., in the pack material and/or the braze fillet) infiltrates the braze reactant layer to react with the carbon source material therein and form a ceramic material joining densified ceramic components into a unitary ceramic component. After heating, the unitary ceramic component may be cooled and the pack material may be removed from external surfaces of the unitary ceramic component. Although not shown in FIG. 5, a portion of an external surface of one or more of the densified ceramic components may be masked prior to heating and prior to positioning the pack material around them.

As stated, the resulting unitary ceramic component has a unified construction in which the integrated portions are inseparable and bonded to one another to form a continuous component. Thus, the resulting unitary ceramic component may be utilized as a single component while being formed in a process that allows more complex shapes to be more easily formed (e.g., without complicated ply layup processes). As such, unitary ceramic components may be formed from multiple densified ceramic components without creating additional defects in the unitary ceramic components, since the resulting unitary ceramic components may be formed using the same or substantially similar infiltrate (e.g., Si—B) than the one used by melt infiltration to have a joint with characteristics and properties close to the existing CMC matrix.

Further aspects are provided by the subject matter of the following clauses:

1. A method of forming a unitary ceramic component, the method comprising: positioning a braze reactant layer in a contact area between a first densified ceramic component and a second densified ceramic component, wherein the braze reactant layer comprises a ceramic precursor compound; thereafter, positioning a pack material around at least a portion of the first densified ceramic component or the second densified ceramic component, wherein the pack material comprises a silicon-containing material; positioning at least one infiltrate source in fluid communication with the braze reactant layer, wherein the at least one infiltrate source comprises an infiltrate composition; and thereafter, heating the at least one infiltrate source, the pack material, the first densified ceramic component, and the second densified ceramic component to a braze temperature that is at or above a melting point of at least one phase of the infiltrate composition such that the at least one phase of infiltrate composition melts and flows into the braze reactant layer and reacts with the ceramic precursor compound to form a ceramic material, the ceramic material joining the first densified ceramic component and the second densified ceramic component into a unitary ceramic component.

2. The method of any preceding clause, wherein the ceramic precursor compound comprises a carbon source material.

3. The method of any preceding clause, wherein the pack material comprises the at least one infiltrate source.

4. The method of any preceding clause, wherein the positioning the pack material comprises completely encasing the first densified ceramic component and the second densified ceramic component.

5. The method of any preceding clause, wherein the infiltrate composition comprises silicon metal, a silicon alloy, or a mixture of any combination thereof.

6. The method of any preceding clause, wherein the pack material further comprises a binder, a curing agent, a solvent, or a mixture of any combination thereof.

7. The method of claim 1, wherein the pack material is in the form of a powder-containing material.

8. The method of any preceding clause, wherein the positioning the pack material comprises applying a coating on external surfaces of the first densified ceramic component and the second densified ceramic component.

9. The method of any preceding clause, wherein the at least one infiltrate source comprises a braze fillet positioned in fluid communication with the braze reactant layer.

10. The method of any preceding clause, further comprising: prior to positioning the pack material around at least a portion of the first densified ceramic component and the second densified ceramic component, positioning the braze fillet adjacent to at least one external edge of the braze reactant layer between the first densified ceramic component and the second densified ceramic component.

11. The method of any preceding clause, wherein the braze fillet comprises silicon metal, a silicon alloy, or a mixture of any combination thereof.

12. The method of any preceding clause, wherein the at least one infiltrate source comprises a puck positioned in fluid communication with the braze reactant layer.

13. The method of any preceding clause, further comprising: positioning a puck in fluid communication with the braze reactant layer, wherein the infiltrate composition flows, upon melting, from the puck to the braze reactant layer via a wick sheet or wick strand.

14. The method of any preceding clause, wherein the puck comprises silicon metal, a silicon alloy, or a mixture of any combination thereof.

15. The method of any preceding clause, further comprising: prior to heating the pack material and after positioning the pack material around at least a portion of the first densified ceramic component and the second densified ceramic component, wrapping the pack material, the first densified ceramic component, and the second densified ceramic component in a carbon sheet.

16. The method of any preceding clause, further comprising: after heating the pack material to the braze temperature, cooling the unitary ceramic component; and removing the carbon sheet from around the first densified ceramic component and the second densified ceramic component and the pack material from external surfaces of the unitary ceramic component.

17. The method of any preceding clause, wherein the braze reactant layer further comprises a braze filler.

18. The method of any preceding clause, wherein the braze filler comprises inorganic particles.

19. The method of any preceding clause, wherein the positioning the braze reactant layer comprises positioning the braze reactant layer between an entire contact area defined between the first densified ceramic component and the second densified ceramic component.

20. The method of any preceding clause, further comprising: applying a mask applied to a portion of an external surface on the first densified ceramic component, the second densified ceramic component, or both prior to positioning the pack material around at least a portion of the first densified ceramic component and the second densified ceramic component.

21. A unitary ceramic component formed by the method of any preceding clause.

22. A unitary ceramic component comprising a densified ceramic material between a first densified ceramic component and a second densified ceramic component.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of forming a unitary ceramic component, the method comprising:

positioning a braze reactant layer in a contact area between a first densified ceramic component and a second densified ceramic component, wherein the braze reactant layer comprises a ceramic precursor compound;

thereafter, positioning a pack material around at least a portion of the first densified ceramic component or the second densified ceramic component, wherein the pack material comprises a silicon-containing material;

positioning at least one infiltrate source in fluid communication with the braze reactant layer, wherein the at least one infiltrate source comprises an infiltrate composition; and thereafter, heating the at least one infiltrate source, the pack material, the first densified ceramic component, and the second densified ceramic component to a braze temperature that is at or above a melting point of at least one phase of the infiltrate composition such that the at least one phase of infiltrate composition melts and flows into the braze reactant layer and reacts with the ceramic precursor compound to form a ceramic material, the ceramic material joining the first densified ceramic component and the second densified ceramic component into a unitary ceramic component.

2. The method of claim 1, wherein the ceramic precursor compound comprises a carbon source material.

3. The method of claim 1, wherein the pack material comprises the at least one infiltrate source.

4. The method of claim 1, wherein the positioning the pack material comprises completely encasing the first densified ceramic component and the second densified ceramic component.

5. The method of claim 1, wherein the infiltrate composition comprises silicon metal, a silicon alloy, or a mixture of any combination thereof.

6. The method of claim 1, wherein the pack material further comprises a binder, a curing agent, a solvent, or a mixture of any combination thereof.

7. The method of claim 1, wherein the pack material is in the form of a powder-containing material.

8. The method of claim 1, wherein the positioning the pack material comprises applying a coating on external surfaces of the first densified ceramic component and the second densified ceramic component.

9. The method of claim 1, wherein the at least one infiltrate source comprises a braze fillet positioned in fluid communication with the braze reactant layer.

10. The method of claim 9, further comprising:
prior to positioning the pack material around at least a portion of the first densified ceramic component and the second densified ceramic component, positioning the braze fillet adjacent to at least one external edge of the braze reactant layer between the first densified ceramic component and the second densified ceramic component.

11. The method of claim 9, wherein the braze fillet comprises silicon metal, a silicon alloy, or a mixture of any combination thereof.

12. The method of claim 1, wherein the at least one infiltrate source comprises a puck positioned in fluid communication with the braze reactant layer.

13. The method of claim 12, further comprising:
positioning a puck in fluid communication with the braze reactant layer, wherein the infiltrate composition flows, upon melting, from the puck to the braze reactant layer via a wick sheet or wick strand.

14. The method of claim 12, wherein the puck comprises silicon metal, a silicon alloy, or a mixture of any combination thereof.

15. The method of claim 1, further comprising:
prior to heating the pack material and after positioning the pack material around at least a portion of the first densified ceramic component and the second densified ceramic component, wrapping the pack material, the first densified ceramic component, and the second densified ceramic component in a carbon sheet.

16. The method of claim 15, further comprising:
after heating the pack material to the braze temperature, cooling the unitary ceramic component; and
removing the carbon sheet from around the first densified ceramic component and the second densified ceramic component and the pack material from external surfaces of the unitary ceramic component.

17. The method of claim 1, wherein the braze reactant layer further comprises a braze filler.

18. The method of claim 17, wherein the braze filler comprises inorganic particles.

19. The method of claim 1, wherein the positioning the braze reactant layer comprises positioning the braze reactant layer between an entire contact area defined between the first densified ceramic component and the second densified ceramic component.

20. The method of claim 1, further comprising:
applying a mask applied to a portion of an external surface on the first densified ceramic component, the second densified ceramic component, or both prior to positioning the pack material around at least a portion of the first densified ceramic component and the second densified ceramic component.

* * * * *